Patented Oct. 30, 1928.

1,689,732

UNITED STATES PATENT OFFICE.

IRVING F. LAUCKS AND GLENN DAVIDSON, OF SEATTLE, WASHINGTON, ASSIGNORS TO I. F. LAUCKS, INC., OF SEATTLE, WASHINGTON, A CORPORATION OF WASHINGTON.

VEGETABLE GLUE AND METHOD OF MAKING SAME.

No Drawing.   Application filed October 29, 1923.   Serial No. 671,381.

The art of making a water-proof glue from certain protein materials has been known for some time; thus casein and blood albumin are in common use. These last mentioned compounds, however, have a number of disadvantages from a practical standpoint. Casein is costly and lack of uniformity in the material as derived from various sources is a serious detriment; while blood albumin is not available except in certain situations. There is accordingly a great demand, particularly in the veneer industry where large quantities of glue are consumed, for a new glue that will be cheap and at the same time sufficiently water-proof.

By water-proof, in this connection, it is not meant that glues thus characterized will resist the action of water indefinitely, but it is meant that they are water-proof in the sense in which the term is used in the veneer industry, viz, that a panel can be soaked in cold water for from seventy-two to one hundred hours, or in boiling water for eight hours, without separation.

Vegetable compounds have not, so far as we are aware, been heretofore satisfactorily employed as a basis for waterproof glues of the type in question. It is true that some veneer makers, on account of the high price of casein, have come to use starch glues but these, at least as heretofore made, are not at all waterproof, and vegetable proteins have not heretofore been used at all, so far as we are aware.

We have now discovered, however, that by subjecting the same to proper treatment, such vegetable proteins or vegetable matter containing proteins in proper amount can be converted into a water-proof glue that will satisfy the rigid requirements of veneer or plywood making. The requisite raw material may be derived from a number of sources and the treatment of such material is relatively simple and inexpensive so that as a result we are able to produce a satisfactory glue at a much lower cost than has heretofore been possible.

To the accomplishment of the foregoing and related ends, the invention, then, consists of the combination of ingredients or composition of matter and the steps involved in the preparation of such composition hereinafter fully described and particularly pointed out in the claims, it being understood that such disclosed ingredients and steps constitute but several of the various ways in which the principle of the invention may be used.

We have found that soya bean flour constitutes an admirable raw material for our purpose. Such flour is preferably made by grinding soya bean cake so that 80 per cent will pass a 100 mesh screen and when treated with certain chemicals, or other substances, we make therefrom a very satisfactory glue that meets the requirements of the veneer trade fully and is in many respects better than the usual glues now on the market. Such bean cake, as analyzed by us, is found to contain on the average 45 per cent protein, 12 per cent water, 5 per cent cellulose or crude fiber, 7 per cent oil, 6 per cent ash, and 25 per cent carbohydrates.

We do not, however, wish to limit ourselves to soya bean flour or to vegetable protein derived from this source for we have made satisfactory glue by our improved process from similar seed flours, or protein matter derived from such, in which there is a considerable protein content, examples of which are linseed flour, cotton seed flour, and the like; that is, soya bean flour gives the best results, but other sources of vegetable protein-containing material may be employed with proportionately advantageous results.

Soya bean flour made from soya bean cake from which the oil has been expressed, is preferably used in practice because it is cheaper and makes a better glue, but flour made from whole soya beans, without expressing the contained oil, may also be used, although obviously this would not be economical in view of the value which attaches to such oil. As to the fineness of the flour, it is not necessary that the meal be ground as fine as indicated above, but fineness is desirable from a practical standpoint.

When the usual chemicals employed in making casein glue, viz, lime and sodium silicate, are added to a vegetable protein-containing material, for example, soya bean flour, a glue results, but it is not as good as casein glue. It is not as highly water resistant nor as workable. We find, however, by the use of caustic soda with such vegetable protein-containing matter, a much better glue is obtained, such caustic soda apparently playing the part of dispersing the colloidal material. The resultant glue is then somewhat similar in its working properties to casein glue, although its water resistance is still slightly less.

In practice, there is a great difference between vegetable protein-containing glues made up by treatment with caustic soda as such and glues made by treatment with lime and sodium salts which by interaction may produce caustic soda. We do not at present know just why this difference exists, but it may be due to the presence of colloids, and the vegetable protein interfering with the expected interaction.

Preferably we react on our vegetable protein-containing material with both caustic soda and lime. As equivalents of such caustic soda, caustic potash and ammonia may be used, although more expensive. Other equivalents of caustic soda are salts of soda (or potash) with weak acids, e. g. sodium phosphate, sodium borate and the like. Similarly in place of lime, magnesia, baryta and strontia may be used as equivalents.

In order to improve what may be termed the working properties, of the glue produced as aforesaid as well as the water resisting properties, we have found it desirable to add other substances of which the following are examples:—

Copper sulfate, cuprammonium compounds, copper-caustic soda compounds. Equivalents would be other water soluble compounds of copper.

Quebracho, sumach, spruce extract (concentrated sulfite liquor). These are all commonly used tanning agents. Equivalents would be other vegetable tanning agents.

Sodium silicate, or other soluble silicates.

Rosin, sodium or calcium salts of rosin. Equivalents would be other resin or resin combinations with metals.

In general, we may say that copper salts make the glue more readily workable while at the same time increasing the water resistance; that the silicates and related compounds act as thinners while at the same time increasing the water resistance and the strength of the glue; and that rosin and derivatives thereof act as thinners and make the glue more readily workable. Substances such as the foregoing, which act as a thinner, or render the glue more readily workable, may be appropriately referred to as spreaders.

We have also found that certain substances will act in the same way as the caustic soda and also as thinners, e. g. sodium phosphate, sodium perborate and sodium sulphite. These salts are all related in that they are combinations of a strong base with a weak acid (as contrasted with a strong acid), and in that sense may be included in the category of alkaline materials, and there are a number of other salts that fall in the same category and which have a similar effect, so need not be listed in detail.

As examples we may cite the following typical formulæ:—in which, unless otherwise noted, ordinary temperatures will be understood to obtain in the mixing operations.

(1) Mix 30 parts soya bean flour, 5 parts rosin, 1½ parts copper sulfate, 1 part quebracho together dry; add 90 parts water and 26 parts 18 per cent caustic soda solution (or expressed more concisely in direct terms, about 4½ parts of caustic soda) stir well; add 6 parts calcium hydrate in 15 parts water; then add 15 parts water glass, giving finished glue.

(2) Mix 30 parts linseed flour, 70 parts water; add 13 parts 18 per cent caustic soda solution (or expressed more concisely in direct terms, about 2 parts of caustic soda) and 4 parts calcium hydrate in 20 parts water.

The particular order in which the several ingredients are admixed together in the formulæ just given may be varied, and it is not necessary that the manufacture of the product be completed in a single continuous operation, but as a matter of practice we have found it desirable in certain cases to mix only certain of the ingredients initially and then add the others just before the glue is required for use. Thus, the soya bean flour or the like, the lime and chemicals may be mixed dry, and in this form be shipped to the veneer plant. There the dry material may then be made up with water and caustic soda, and sodium silicate if desired, to the finished glue.

Other modes of applying the principle of our invention may be employed instead of the one explained, change being made as regards the process herein disclosed or the materials employed in carrying out such process provided the stated ingredients and steps or the equivalent of such stated ingredients or steps be employed.

We therefore particularly point out and distinctly claim as our invention:—

1. A vegetable glue composition, comprising the reaction products of a vegetable seed flour of considerable protein content and an alkali metal hydroxide as such in an aqueous medium.

2. A vegetable glue composition, comprising the reaction products of soya bean flour and an alkali metal hydroxide as such in an aqueous medium.

3. A vegetable glue composition, comprising the reaction products of a vegetable seed flour of considerable protein content, an alkali metal hydroxide as such in an aqueous medium, and calcium hydrate.

4. A vegetable glue composition, comprising the reaction products of soya bean flour, an alkali metal hydroxide as such in an aqueous medium, and calcium hydrate.

5. A vegetable glue composition, comprising the reaction products of vegetable seed flour of considerable protein content, caustic soda as such, and calcium hydrate in the proportions of about 30 parts of such flour, about 2–4½ parts of caustic soda in aqueous solution and about 3–6 parts of calcium hydrate.

6. A vegetable glue composition, comprising the reaction products of soya bean flour, caustic soda as such, calcium hydrate, and an alkali metal silicate, the proportions of the soya bean flour, the caustic soda and the calcium hydrate being about 30 parts of the soya bean flour, about 2–4½ parts of caustic soda in aqueous solution, and about 3–6 parts of calcium hydrate.

7. The process of making a vegetable glue, which comprises treating a vegetable protein flour with an alkali metal hydroxide as such in an aqueous medium, the proportions of such flour and the alkali metal hydroxide being about 30 parts of the flour and about 2–4½ parts of said hydroxide in aqueous solution.

8. The process of making a vegetable glue, which comprises treating soya bean flour with caustic soda as such in an aqueous medium, the proportions of such flour and the caustic soda being about 30 parts of the flour and about 2–4½ parts of caustic soda in aqueous solution.

9. A vegetable glue composition, comprising the reaction products of vegetable flour matter having a considerable protein content, caustic soda as such, and calcium hydrate in the proportions of about 30 parts of flour, 13 to 26 parts of an 18% caustic soda solution, and 3 to 6 parts of calcium hydrate.

10. A vegetable glue composition, comprising the reaction products of soya bean flour, caustic soda as such, calcium hydrate, and an alkali metal silicate, the proportions of the soya bean flour, the caustic soda and the calcium hydrate being about 30 parts of flour, 13 to 26 parts of an 18% caustic soda solution, and 3 to 6 parts of calcium hydrate.

Signed by us, this 22d day of October, 1923.
IRVING F. LAUCKS.
GLENN DAVIDSON.

DISCLAIMER 1,689,732.—*Irving F. Laucks* and *Glenn Davidson*, Seattle, Wash. VEGETABLE GLUE AND METHOD OF MAKING SAME. Patent dated October 30, 1928. Disclaimer filed May 23, 1930, by the assignee, *I. F. Laucks, Inc.*

Hereby enters this disclaimer to that part of the said specification as is herein below specifically set forth and to any interpretation of the claims which possibly might be interpreted to include any of such disclaimed matter:

Page 1, line 36, cancel "vegetable proteins or."
Page 1, line 72, cancel "or to vegetable protein derived from this source."
Page 2, line 13, cancel "and ammonia." Ammonia is not an equivalent of caustic soda as such and since caustic soda as such is retained as the specific invention of the application Serial Number 671,381, the reference to ammonia was incorrectly allowed to remain in the said application.
Page 2, lines 14–17, cancel "other equivalents of caustic soda are salts of soda (or potash) with weak acids— e. g., sodium phosphate, sodium borate, and the like."
Page 2, line 18, cancel "magnesia."
Page 2, line 51, cancel "in the same way as the caustic soda and also."

The above explanation as set forth relative to ammonia is likewise applicable to the other parts deleted beginning with page 2, lines 14–17 and ending line 51. It was an error to allow the above deleted agents to remain in the specification from which the divisional applications were made, as equivalents of caustic soda as such.

Your petitioner disclaims any interpretation or construction of the specification or claims of the said patent which brings within the scope or import of the specification or claims of said patent *chemically isolated or chemically extracted vegetable protein.*

[*Official Gazette June 10, 1930.*]